UNITED STATES PATENT OFFICE.

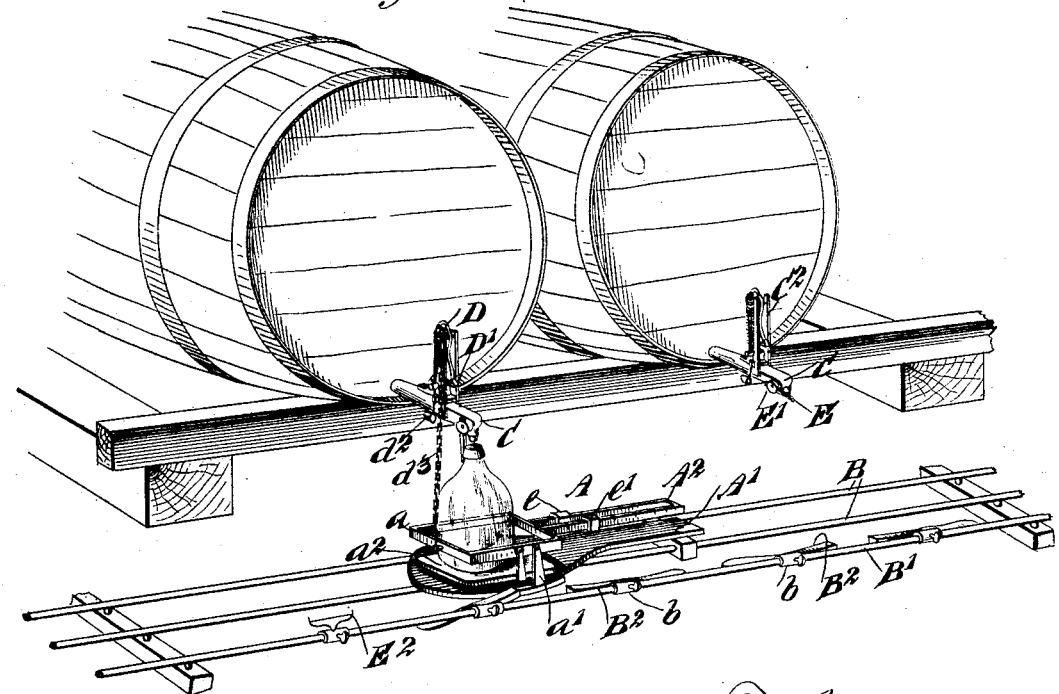
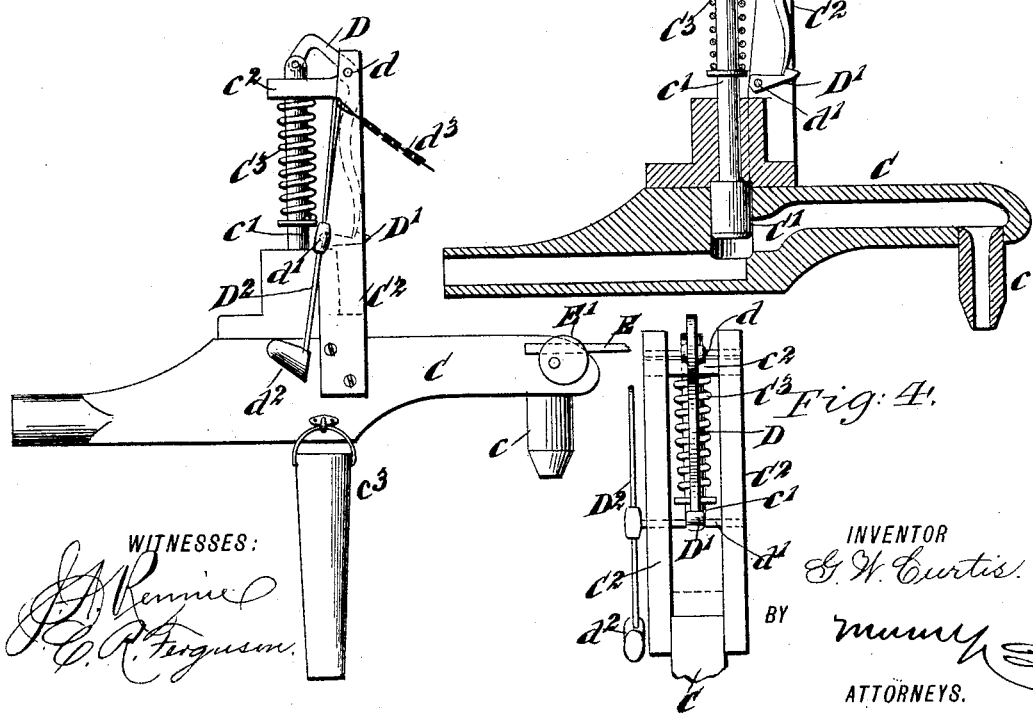

GEORGE W. CURTIS, OF LONG GROVE, IOWA.

LIQUID-MEASURING DEVICE.

SPECIFICATION forming part of Letters Patent No. 571,217, dated November 10, 1896.

Application filed February 14, 1896. Serial No. 579,225. (No model.)

*To all whom it may concern:*

Be it known that I, GEORGE W. CURTIS, of Long Grove, in the county of Scott and State of Iowa, have invented a new and Improved Liquid-Measuring Device, of which the following is a full, clear, and exact description.

This invention relates to devices for measuring liquids by weight, and the object is to provide a simple device for this purpose by which the flow of liquid will be automatically cut off when the desired amount shall have been run into the receiving vessel, and, further, to provide means whereby the device may be quickly and easily moved from one barrel to another.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the device embodying my invention as applied. Fig. 2 is a side elevation of a faucet employed. Fig. 3 is a vertical section thereof, and Fig. 4 is a front elevation.

Referring to the drawings, A designates a weighing-scale, comprising a base-plate A' and double scale-beam $A^2$, extended from a rectangular frame portion $a$, which is fulcrumed on posts $a'$, extended upward from the base-plate. Depending from the frame $a$ is a swinging platform $a^2$, upon which a vessel is to be placed to receive its measure of liquid, as indicated in Fig. 1.

The scale A is mounted to slide on tracks or guideways B, extended along the front of a row of barrels, so that the scale may be easily moved from one barrel to another as desired. Outside the tracks B is a rod or bar B', upon which are mounted stops $B^2$, for determining the proper position of the scale in front of a barrel, so that the mouth of a vessel on the scale-platform may be brought directly under the faucet-outlet of a barrel. It may be here stated that preferably the top of the scale-platform will be provided with a number of concentric marks, approximating the different sizes of jugs or other vessels, and by means of which a vessel may be properly centered.

There are two stops $B^2$ for each barrel, and each stop consists of a lever pivoted at its center on a sleeve $b$, adjustable longitudinally of the rod or bar B', and secured as adjusted by a set-screw. These stops will lie normally below the plane of the scale, so that the scale may be moved back and forth on its tracks without interruption. In operation, however, one end of a lever will be raised in order that a shoulder or projection on the scale bed-plate may engage against it. That is, assuming that the scale is to be moved from the barrel shown at the right-hand side of Fig. 1 to the left-hand barrel, the operator will raise the stop end of the extreme left-hand stop-lever by placing his foot upon the opposite end. Thus the scale bed-plate is moved against the stop end, as plainly indicated in the drawings.

I will now describe a faucet to be used in connection with my device.

The faucet C may be made of any suitable material, either wood or metal. It is provided with an outlet-tube $c$ for discharging liquid into a vessel on the scale. Intermediate of its ends the faucet is provided with a vertically-operating plug-valve C', having a stem $c'$ extended upward through a bearing on the top of the faucet and through an opening in a bracket $c^2$, projected from posts $C^2$ on the faucet. Between the under side of the bracket $c^2$ and a collar on the stem $c'$ is placed a coil-spring $C^3$, designed to force the plug-valve downward to cut off the supply of liquid.

The locking mechanism for securing the plug-valve in its open position comprises an angle-lever D, connected between its ends to a rock-shaft $d$, having bearings in the upper portions of the posts $C^2$. The upper end of the lever D is curved rearward and downward to a pivotal connection with the upper end of the valve-stem $c'$, and the lower portion of said lever is adapted to engage its end with a hook-latch D', mounted on and extended forward from a rock-shaft $d'$, having bearings in the posts $C^2$. One end of the rock-shaft $d'$ is extended through a post $C^2$, and on the outer end is mounted a rod $D^2$, the lower end of which is provided with a counterbalance-weight $d^2$, and the upper end of which is designed for detachable engagement with a chain $d^3$ or other flexible connection, the lower end of said connection being fastened to the frame portion $a$ of the scale.

In addition to the stops for determining the proper position of the scale, I may employ a guide on the faucet. This guide consists of a rod E, mounted on a block $E'$, which is pivotally connected to one side of the faucet near its outer end. By turning the rod E to a vertical position its lower portion will be in line with the outlet $c$ in a position to engage the outer side or neck portion of a vessel on the scale. By turning the rod to a horizontal position it will be out of the way, so as to allow the movement past the faucet of the scale and vessel thereon.

The operation may be described as follows: After moving the scale to its proper position in front of the desired barrel the jug or other vessel will be placed on the scale-platform and balanced by means of the balancing-weight $e$ on one of the arms of the scale-beams $A^2$, and then the proper weight $e'$ will be placed in its determined position on the other arm of the scale-beam. The upper end of the flexible connection $d^3$ is now to be engaged with the upper end of the rod $D^2$ and the valve opened and held by engaging the lower end of the lever D with the latch $D'$, which is held yieldingly in a substantially horizontal position by the counterweight on the rod $D^2$. The device may now be left with the liquid running, and when the desired amount shall have run into the jug and overbalanced the weight $e'$ the weight of the liquid will rock the scale-beam downward, and by drawing the connection $d^3$ will rock the shaft $d'$ to move the latch $D'$ out of engagement with the lever D, so that the spring $C^3$ will force the valve-plug to its closing position and thus automatically cut off the flow of liquid. It will be seen, therefore, that after placing the scale and jug in position and starting the flow of liquid no further attention is required from an attendant.

As liquids are not all of the same specific gravity, it is obvious that a proper weight or weights must be provided for each liquid. The weight or weights for a liquid may be conveniently placed on a holder $E^2$, adjustably mounted on the bar $B'$ adjacent to the barrel.

For convenience in filling jugs too short to reach to the faucet I may employ an extension-tube $c^3$. When not in use, it may be hung up in any desired place or on a hook secured to the faucet, as indicated.

Having thus described my invention, I claim as new and desire to secure by Letters Patent—

1. A liquid-measuring device, comprising a scale, a track on which the same is mounted, stop-levers mounted on a support extending longitudinally of the track, and means for connecting the scale-beam with the valve-operating mechanism of a faucet, substantially as specified.

2. A liquid-measuring device, comprising a scale, a track on which the same is mounted, a rod extending longitudinally of the track at one side thereof, and stop-levers adjustably mounted on said rod, the said stop-levers being adapted to engage a shoulder or projection on the scale, substantially as specified.

3. A liquid-measuring device, comprising a scale, a faucet, a spring-pressed plug-valve for said faucet provided with an upwardly-extending stem, posts on said faucet carrying a bracket through which the upper end of the valve-stem extends, an angle-lever pivoted between its ends in the upper portions of said posts, the upper end of said lever having a pivotal connection with the upper end of the valve-stem, a latch adapted to engage the lower end of the lever to hold the valve in an open position, and a connection extending from the scale-beam for releasing the said latch, substantially as described.

4. A liquid-measuring device, comprising a scale, a faucet, a plug-valve for the faucet and having an upwardly-extending stem, a spring for closing the valve, a pivoted lever having one end engaged with the valve-stem, a rock-shaft, a latch on the rock-shaft to engage with the lower end of the lever, and a rod attached to the rock-shaft, having a counterbalanced lower end and having its upper end adapted for engagement with the scale-beam, substantially as specified.

GEORGE W. CURTIS.

Witnesses:
J. W. BLAIR,
J. H. MARRIOTT.